Feb. 20, 1968 R. B. DOWNEY 3,369,470
CAMERA APPARATUS
Filed Dec. 27, 1965 5 Sheets-Sheet 2

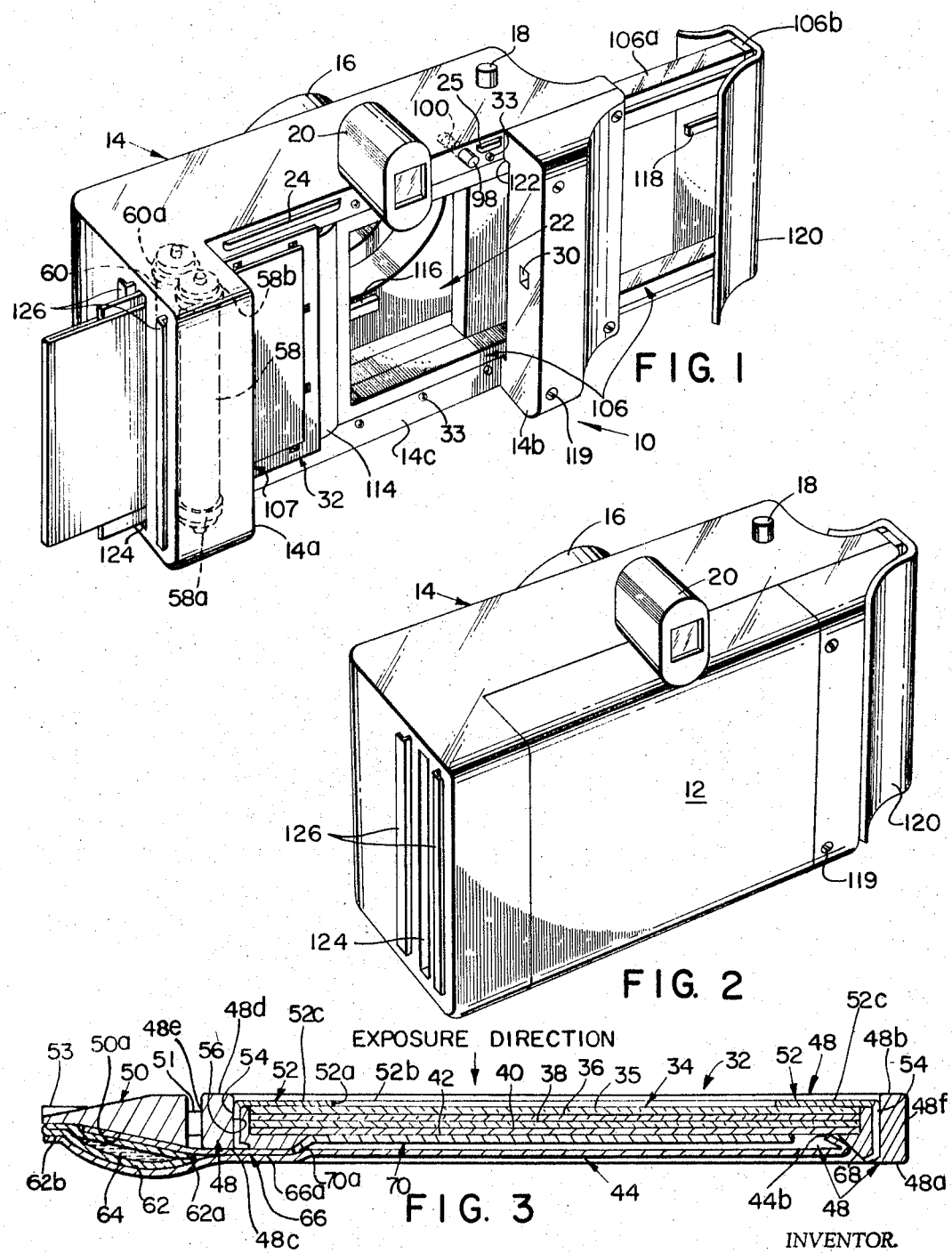

INVENTOR.
Rogers B. Downey
BY
Brown and Mikulka
ATTORNEYS

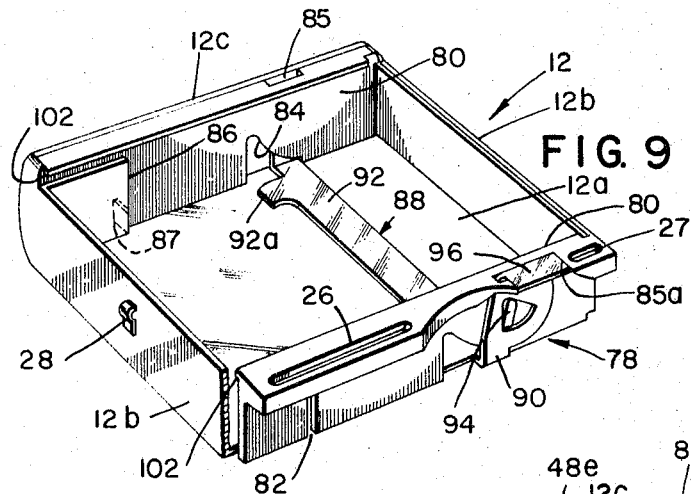
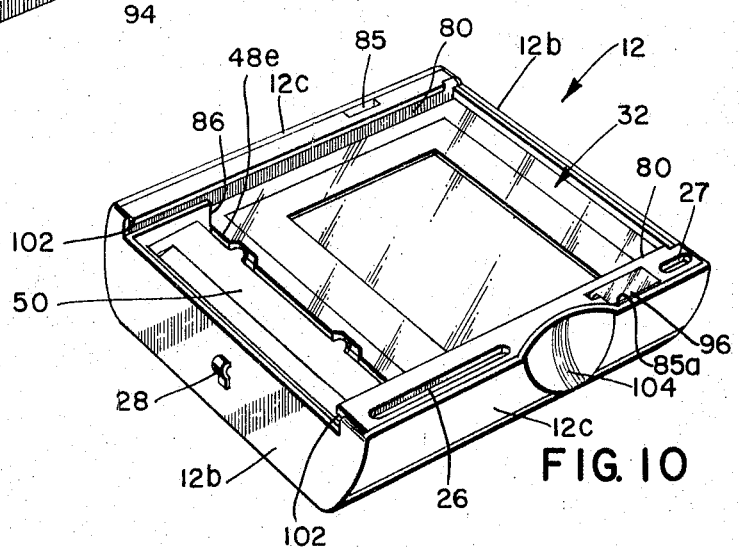
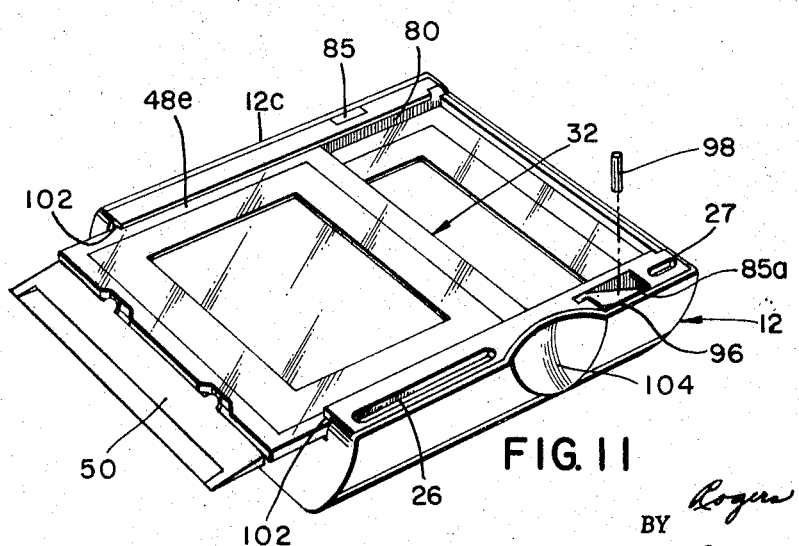

Feb. 20, 1968 R. B. DOWNEY 3,369,470
CAMERA APPARATUS
Filed Dec. 27, 1965 5 Sheets-Sheet 4

INVENTOR.
Rogers B. Downey
BY
Brown and Mikulka
ATTORNEYS

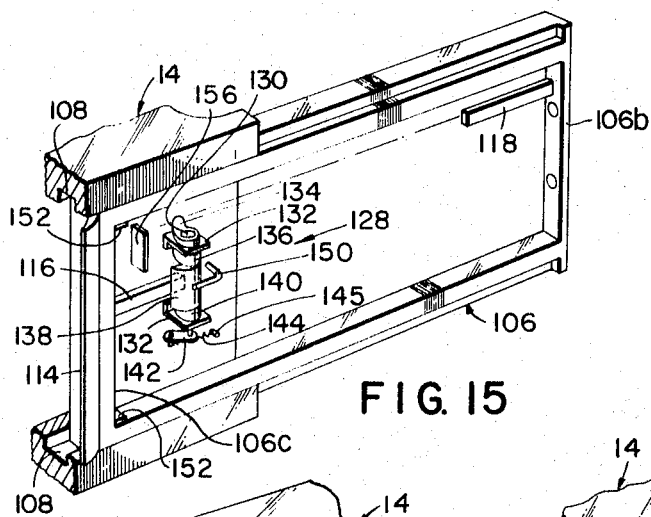
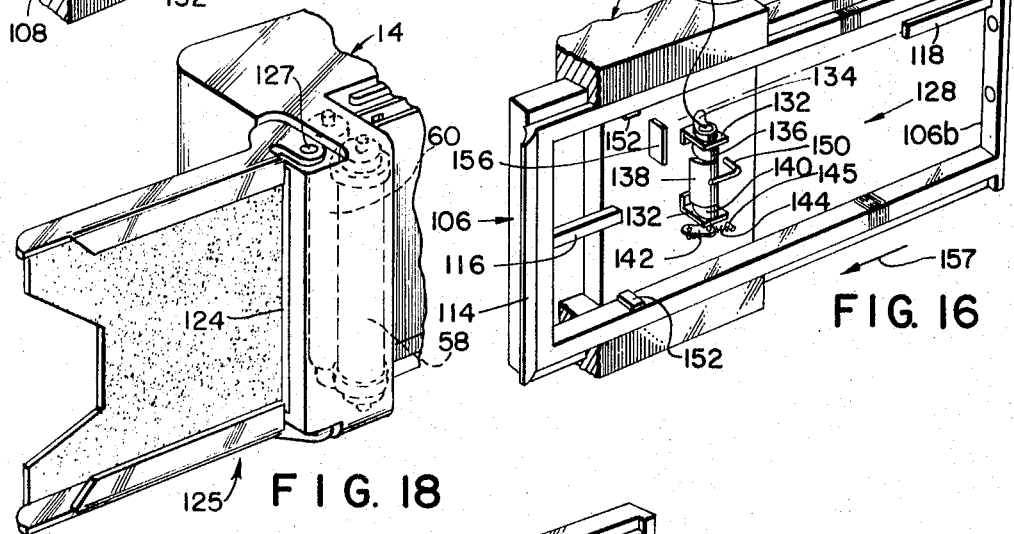
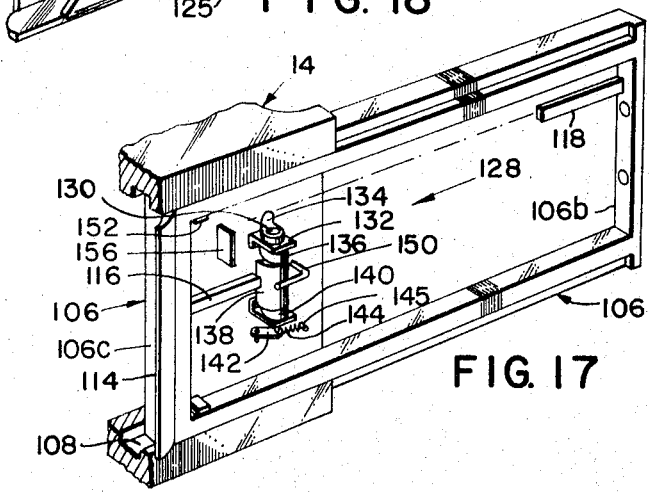

United States Patent Office 3,369,470
Patented Feb. 20, 1968

3,369,470
CAMERA APPARATUS
Rogers B. Downey, Lexington, Mass., assignor to Polaroid Corporation, Cambridge, Mass., a corporation of Delaware
Filed Dec. 27, 1965, Ser. No. 516,416
18 Claims. (Cl. 95—13)

This invention relates to apparatus embodied in a so-called miniature or 35 mm. camera for processing a plurality of semi-mounted film assemblies which are carried by and photographically exposed within said camera.

The subject apparatus, in conjunction with the aforesaid film assemblies and a diffusion transfer method of image formation, is capable of producing finished photographic transparencies in either black-and-white or full color, the latter being a particular objective. Each film assembly is of a type which includes a substantially rigid mount as one of its basic components. Immediately after processing the exposed emulsion, a fully-mounted transparency suitable for direct viewing or projection is made available following removal of the film assembly from the camera.

A film assembly of a type suitable for use with the apparatus of the present invention includes a releasably-carried processing liquid. It is of a multilayer structure such that after exposure, release of the liquid by the application of a compressive force to a liquid-containing component thereof and imbibition of the liquid into predetermined layers, including an exposed silver halide emulsion layer, provide an image. The image is formed by the transfer of image-forming substances to a designated image-receiving surface. Processing is initiated by moving the film assembly between compressive means and involves mechanical transport means operating according to a predetermined program. A processing liquid suitable for use in forming the image may comprise an aqueous solution of a silver halide developer such as hydroquinone, a silver halide solvent of the type of sodium thiosulfate, and an alkaline substance such as sodium hydroxide. It may also preferably include a thickening or film-forming agent such as a synthetic polymer of the type of sodium carboxymethyl cellulose and, possibly, a high-molecular-weight polymeric mordant to facilitate the transfer process. In producing a black-and-white image, a latent image is developed; the exposed silver halide is reduced to silver, and the un-reduced silver halide forms a soluble silver complex which is transferred from undeveloped areas to the image-receiving surface, the image being formed on the latter in silver. In the production of a color transparency, substances capable of forming dye images at the image-receiving surface such as dyes, color couplers, or the like, may be employed in the transfer process. Or, a black-and-white image in conjunction with a color screen may be employed to provide an image visible in a gamut of colors. Methods and film materials for producing black-and-white or multicolored images, of categories broadly related to those contemplated herein, are described in U.S. Patents Nos. 2,543,181, 2,614,926 2,707,-150, 2,726,154, 2,944,894, 2,968,554, 2,983,606 and 3,087,815 and in the copending U.S. patent application Ser. No. 516,494, filed Dec. 27, 1965.

Objects of the present invention are to provide apparatus for conveniently and rapidly processing film assemblies of the character described which, by reason of its simplicity and compactness, is particularly suited to incorporation with a miniature camera such, for example, as a camera of a so-called single-lens reflex type without noticeably adding to the bulk of the camera; to provide processing apparatus, as described, by which the film assembly, after exposure, is transported by a "pusher" type of mechanism between compressive means and then to a location outside of the camera; to provide apparatus of the type set forth which enables the photographic exposure and processing of a plurality of film assemblies in rapid succession; to provide apparatus of the subject category which is especially adapted to cooperate with a film assembly and a container therefor of particular types; to provide apparatus of the character described which includes a safety locking mechanism which insures its functioning in a succession of complete processing cycles; and to provide processing apparatus which performs its function, easily, efficiently and without mechanical complexity.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic rear view, in perspective, of a camera embodying the apparatus of the invention with the film-assembly magazine removed;

FIG. 2 is a diagrammatic, perspective, rear view of the camera of FIGURE 1, with the film-assembly magazine installed;

FIG. 3 is a side elevation, in cross-section, of a film assembly employed in conjunction with apparatus of the invention; the assembly being exaggerated dimensionally to more clearly show its structure;

FIG. 9 is a diagrammatic perspective view, partly in section, of a film-assembly container or magazine employed with apparatus of the invention;

FIGS. 10 and 11 are diagrammatic perspective views of the magazine, including film assemblies loaded therein;

FIGS. 13-17 are diagrammatic perspective views showing safety mechanism of the apparatus of the invention for insuring the correct processing of film assemblies employed therewith; and FIG. 18 is a fragmentary diagrammatic perspective view of a semi-chamber adapted to receive a compressed film assembly.

Figure 5:
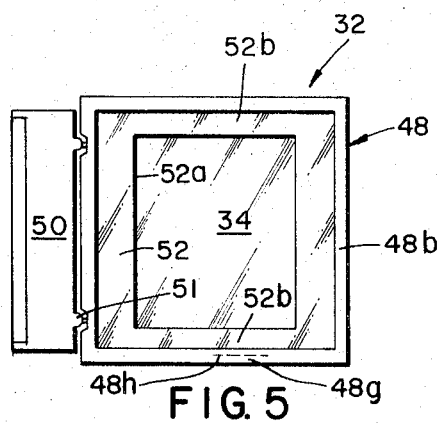
FIGS. 5 and 6 are diagrammatic front and rear views, respectively, of the film assembly.

Referring now to FIGURE 1, a miniature camera 10 embodying the processing apparatus of the invention is shown from the rear, with a container or magazine 12 (FIGS. 9, 10 and 11) removed to reveal the mechanism involved. The camera includes a housing 14 composed of a metal such as aluminum or a suitable plastic, a lens, shutter and diaphragm assembly 16, a shutter release button 18, and a finder 20, these elements being generally conventional, being subject to modification and constituting no special part of the invention. An exposure aperture 22 leads forwardly to the lens, shutter and diaphragm assembly. The terms "front" and "rear" or "forwardly" and "rearwardly," as used herein, refer to proximity to or remoteness from the front of the camera. The terms "upper" and "lower" or "top" and "bottom"

assume that the camera is held horizontally, as shown in FIGURE 1, in determining these locations.

The magazine or container 12 is functionally positioned with respect to the camera when inserted between the rearwardly-extending housing portions 14a and 14b and when a pair of keying flanges 24 and 25 of the camera enter the slots 26 and 27 of the magazine. It is releasably held at correct mounted position on the camera, as shown in FIG. 2, by latching or locking means 28 in engagement with complementary latching means 30 of the camera. When thus mounted a foremost film assembly 32, carried by the magazine, is positioned at the focal plane, in readiness for a photographic exposure. This is accomplished by contact of the positioning protuberances or spacer elements 33 with marginal portions of the film assembly.

To understand the operation of the processing apparatus, it is first necessary to understand the structure of the magazine 12 and of the semi-mounted film assemblies 32 carried therein. As previously stated, a diffusion transfer method of image formation is involved. As shown in FIG. 3, each film assembly is of a type particularly adapted to use with the subject processing apparatus and comprises an image-providing film component 34 including, from front-to-rear, a transparent base layer 35, an additive color-screen layer 36 composed, for example, of red, green and blue transparent screen components arranged geometrically or as an irregular mosaic, a transparent image-receiving layer 38, a photosensitive silver halide emulsion 40, e.g., a panchromatic emulsion, an adhesion control layer 42 composed of a plastic or the like adapted to adhere preferentially to the emulsion, and an opaque cover sheet 44 made, for example, of a thin coated paper stock. The above-described transparent layers are formed of cellulose acetate, cellulose triacetate, sodium carboxymethyl cellulose, or some other suitable plastic material. The layers 35, 36, 38 and 40 are preferably bonded together to provide an integral unit. The layer 42 is not bonded to the emulsion 40 within the picture area but is attached at one end of the composite structure. Photographic exposure is performed through the base 35. A second opaque element or cover sheet (not shown) may, optionally, be brought to a position in front of the base 35 after the photographic exposure for processing purposes, as will be further mentioned below. The color screen serves both in a taking and viewing capacity. The image produced by the diffusion transfer process is essentially a black-and-white image, its colors being derived from the color screen through a selective alignment of image portions with the latter.

The elements of the film assembly 32 making up the aforesaid image-providing component 34 are carried by a substantially rigid mount component 48 composed of a suitably non-deformable material, for example, of a plastic such as a thermoplastic resin of the acetal family, an acrylic, or a polystyrene. The mount includes a tab 50 projecting generally in the plane thereof. The mount and tab are interconnected by a pair of frangible joining or link members 51, the complete unit being conveniently formed as a single molding. A framing element or mask 52 formed, for example, of a thin sheet of a metal such as aluminum, or of a plastic such as a polystyrene, a polyethylene, or a suitable paper is fastened to the front face of the mount 48 by the rearwardly-extending, rivet-like members 54. The latter, in one preferred embodiment, consist of slender overturned extensions or projections of a metallic mask which pass through the small bores 56 formed in the mount. The members 54, when their extremities are crimped, serve to firmly attach the mask to the mount. Assuming that the mask is formed of a material other than a metal, separate rivet-like attaching elements may be employed or the mask may be bonded to the mount by a suitable adhesive. The aperture 52a of the mask outlines the uncovered area of the photosensitive emulsion 40 which is subject to exposure and, accordingly, it determines the dimensions of the finished print. These dimensions may, advantageously, be somewhat larger than the mat-opening measurements of a conventional "35 mm" transparency. Moreover, the image area or mat-opening may be of a shape which is different from that illustrated. Thus, although it is indicated in the illustrations that a slightly "vertical" print is produced when the camera is positioned horizontally, the shape of the mask 52 and the explosable area of film component 34 controlled thereby may be altered to reverse the long and short dimensions illustrated or even to assume a square configuration. The tab 50, having the raised end-portions 53, acts in a wedging capacity when inserted between a pair of compressive means such as the rotatable pressure rolls 58 and 60 to force the rolls apart, at least one of the rolls having resilient mounting means 61 at both ends (FIG. 4, one shown) which determine their compressive characteristics and permit variation of their spacing. When manually broken off, the tab also serves a stripping function to be described relative to removal of the developed emulsion. The raised end-portions 53 serve as spacing means to maintain an even stacking of the film assemblies in the magazine 12. In a modification they may constitute guides relative to the pressure rolls, contributing to a correct linear entry of the film assembly therebetween. In a further modification it is contemplated that they may serve as bearing portions for direct contact with the pressure rolls to control the spacing therebetween.

Figure 4:
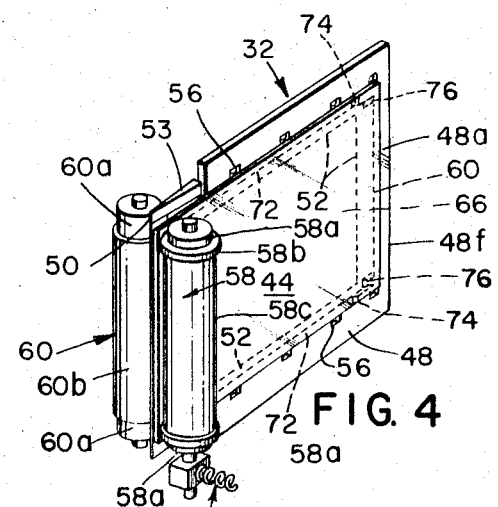
FIG. 4 is a diagrammatic perspective view of the film assembly and processing apparatus of the invention.
Figure 6:
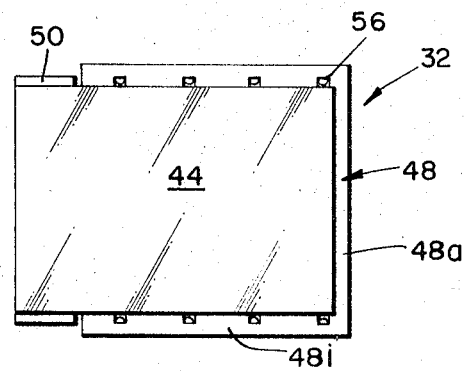
Figure 7:
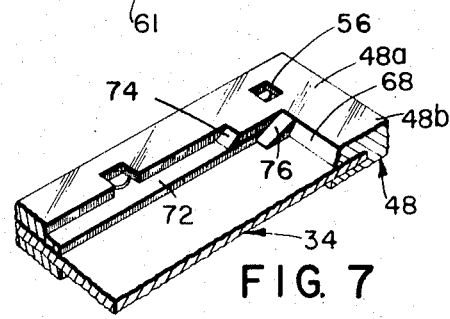
FIG. 7 is a diagrammatic fragmentary view, in perspective, of a portion of the film assembly.
Figure 8:
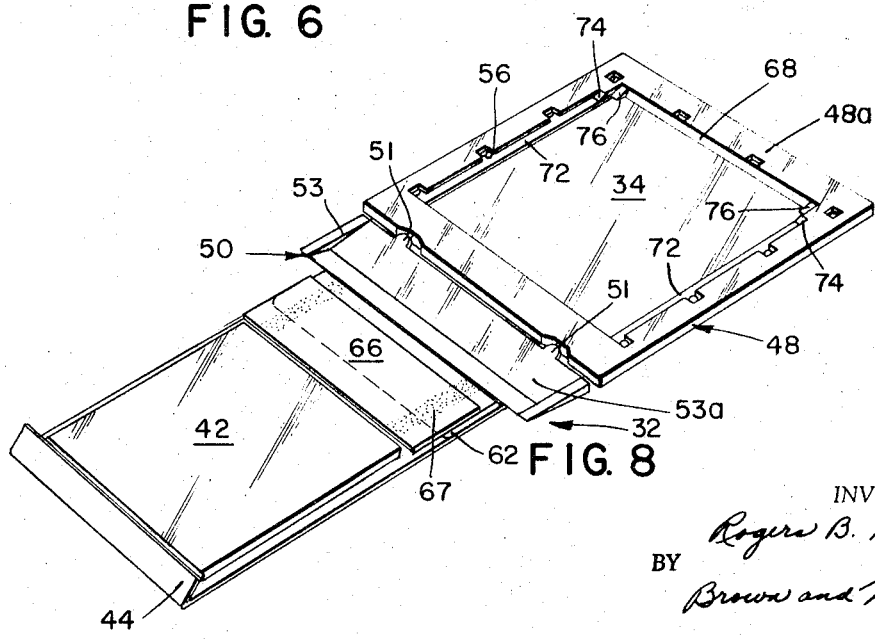
FIG. 8 is a diagrammatic, perspective, rear view of the film assembly, illustrating its structural features.

Further referring to the film assembly 32, a container or pod 62, mounted within a recessed area 50a of the tab, releasably holds a sealed-in processing liquid 64. When the pod is compressed, the processing liquid is released between its separably-sealed edges at 62a. This occurs when the film assembly, as viewed in FIGS. 1, 3 and 4, is advanced in a direction to the left between the pressure rolls. In this connection, the portions of the film assembly first approaching the pressure rolls are termed "leading" and opposite portions of the film assembly are termed "trailing." A sheet-like apron or bib 66, in conjunction with the cover sheet 44, controls to a large degree the flow and spreading of the released processing liquid. The container 62 is attached at its leading marginal area to the tab 50 at 62a. The cover sheet 44 is fastened to leading marginal portions 62b of the container. The apron 66 is bonded to the cover sheet 44 at 66a and the adhesion control sheet 42 is attached to the cover sheet 44 at 70a. The cover sheet 44 terminates in a folded-over portion 44b which serves to prevent escape of the processing liquid from the trailing end of the film assembly during its progressive compression.

Another film structure, adapted to subtractive method of forming the image, per se, in full color, comprises, in order of incidence of the light of a photographic exposure, a transparent base layer, a transparent image-receiving layer, a blue-sensitive silver halide emulsion layer, a layer containing a yellow coupler, a green-sensitive silver halide emulsion layer, a layer containing a magenta coupler, a red-sensitive silver halide emulsion layer, and a layer containing a cyan coupler. Assuming exposure to a multicolored subject and imbibition of the released processing liquid into at least the several emulsion layers, image-forming substances in substantially undeveloped areas of the photographically exposed blue-green-sensitive and red-sensitive emulsions are caused to diffuse to the image-receiving layer to provide, in the latter, registered color-separation images in yellow, magenta, and cyan, respectively. The several layers and cover sheet, in bonded unitary relation, are stripped from the image-receiving layer, after completion of the processing step, leaving the latter layer, containing the multicolored image and integral with the transparent base layer, as a full-color transparency.

Completing the description of the film assembly 32, the mount component 48 includes a pair of beveled, angularly-disposed, inner marginal portions 68 and 70 and a pair of recessed, longitudinal channels or tracks 72. The beveled portions 68 and 70 are disposed at acute angles relative to the planes of the film component 34 and the mount 48. The channels 72 are parallel to these planes. A first pair of ramps 74 leads outwardly and rearwardly from the channels 72 to a rear surface 48a of the mount. A second pair of ramps 76 leads outwardly and rearwardly from the plane of the film component 34 to the surface 48a of the mount. The ramps are thus disposed at acute angles.

The front pressure roll 60 includes a peripheral groove 60a adjacent to each of its extremities. The grooves 60a bear against longitudinal portions 52b of the mask 52 during advancement of the film assembly. The rear pressure roll 58 includes both a peripheral groove 58a and a peripheral flange 58b adjacent to each of its extremities. The pressure roll 58 is of a length, relative to the spacing between the raised or flanged end portions 53 of the tab, such that it is positioned between these end portions during passage of the tab between the pressure rolls. At this stage, the spacing between the rolls, as determined, respectively, by the flanges 58b of the rear roll bearing against the rear surface or cover sheet 44 of the assembly laterally outside of the extremities of the liquid container 62 and by the working surface 60b of the front roll bearing against the front surface of the tab 50, is predetermined to provide a compression of the container such that a separation or opening of the container wall edges at 62a and release of the processing liquid therebetween occurs.

When the mount 48 of the film assembly enters the "bite" of the pressure rolls the peripheral grooves 58a are positioned generally within the longitudinally channels 72 of the mount, but do not actually gear against the channels. This is due to the presence of the intervening marginal portions of the cover sheet 44 and because the load is located where the peripheral flanges 58b and the peripheral grooves 60a bear against opposite sides of the film assembly. Between these elements 58b and 60a of the pressure rolls are located, in order, the film-assembly components 44, 42, 34 and 52. A gap or spacing is thus established between the working or functional surfaces 58c and 60b of the pressure rolls which is predetermined with respect to factors relating to the viscosity of the processing liquid to obtain the most efficient spreading of the liquid.

After the area of the film component 34, lying within the opening determined by the mask 52, has passed between the pressure rolls and spreading of the processing liquid has been completed, it is required to additionally space the rolls 58 and 60 apart to prevent any further spreading action, or, otherwise stated, to trap any excess of the processing liquid. When the trailing, transverse, marginal, surface portions 48a and 48b of the mount are about to enter the "bite" of the pressure rolls, the peripheral grooves 58a of the roll 58 ride along the first pair of ramps 74. Immediately thereafter, the flanges 58b are caused to ride along the second pair of ramps 76 to the surface 48a. Coincidentally, the working surface 60b of the pressure roll 60 contacts, in order, the transverse surface 52c of the mask and the transverse surface portion 48b of the mount. Accordingly, the spacing between the pressure rolls is increased and any remaining excess of the processing liquid is substantially relieved of the compressive force and is effectively "trapped," so that no escape thereof, which might result in a possible fouling of the mechanism, can occur.

During the foregoing operations, the working surface 60b of the front pressure roll is in contact with the support or base layer 35. The principal purpose of the wedge-like tab 50, as previously indicated, is to force the rolls apart in a given manner to permit introduction of the major portion of the film assembly therebetween. Due to the tapered structure of the tab 50 the pressure rolls are progressively forced apart and are at substantially maximum relative spacing when the leading transverse surfaces 48c and 48d of the mount and the leading transverse mask surface 52c are introduced to the pressure rolls. The gap between the rolls progressively lessens as the angled marginal portion 70 of the film-assembly mount is brought between them, the proper spacing for spreading the released processing liquid finally being established.

As previously intimated, the film-assembly container or magazine 12 is suitably composed of a metal or a plastic material, the choice being somewhat dependent on the material of which the camera housing is composed. When installed, the magazine effectively forms a part of the camera housing and may be of either a permanent or a disposable type. When mounted on the camera, it provides, in conjunction with the rear surface 14c of the housing, a narrow light-tight chamber within which are performed photographic exposure and processing of each film assembly, in succession.

The magazine 12, including rear wall 12a and side walls 12b and 12c, and with that side-wall portion 12c nearest the viewer broken away, is shown in FIG. 9. The front face of the magazine is open. Assuming it to be of a disposable type, the gauge of the material thereof may be lighter than that of the camera housing and it may even be composed of a different and less-expensive material to reduce cost.

An inner structure or mechanism 78 embodying film-assembly retaining, positioning or biasing and guiding means is removably-mounted within the enclosing walls of the magazine. The component 78 is in the form of a U-shaped supporting frame, having formed, respectively, in the side members 80 thereof the aforementioned positioning concavities or depressions 26 and 27, a pair of rearwardly-extending slots 82 of constant width, a pair of rearwardly-extending flared slots 84, and a pair of forwardly-extending slots or notches 85 and 85a. The side members 80 are held between the side walls 12b and 12c and a pair of inwardly-extending baffles 86 of the container, the slots 82 engaging the short cross-members 87 extending between the baffles and side walls 12c.

A U-shaped biasing element 88, composed of a metal or a suitable plastic material, includes the perforated side or end members 90 and, integral therewith, the central connecting member 92. The end members 90 are pivotally mounted on a pair of studs or prongs 94 which project outwardly from the side members 80 of the supporting frame. A turned-over tab 96 projects outwardly from one of the end members 90 and is freely movable in the slot 85a. By applying pressure to the tab 96, leverage, in turn, is applied to the element 88, and it is caused to rotate in a clockwise direction about the bearing studs 94 thus moving the laterally-extending portions 92a of the connecting member 92 arcuately in a generally forward direction toward the front or open face of the magazine. The flared slots 84 permit the end members 90 to rotate unrestrictedly, therewithin. The portions 92a are thus caused to bear, through the medium of the cover sheet, against the mount of the rearmost film assembly 32 and to urge it, as well as any film assemblies which may be in front of it, forwardly in the magazine. It will be noted that portions 92a are located approximately centrally of the longitudinal dimension of the magazine so as to apply pressure at the approximate center of the film assembly.

Wherein the terms "longitudinal" and "transverse" are used herein with respect to the magazine, "longitudinal" relates to a direction parallel to the horizontal dimension of the camera and to a direction of movement of a film assembly from the magazine toward the pressure rolls. "Transverse" refers to a direction substantially at 90° thereto.

The above-described actuation of the tab 96 is accomplished through contact therewith by the rearwardly-extending pin 98 (FIGS. 1, 11) when the magazine 12 is mounted on the camera. Pin 98 is retractable to a given degree in an aperture of housing 14 and is biased for movement in a rearward direction by a compression spring 100. The elastic characteristic of the latter is so chosen as to insure depression of the tab 96 and the aforesaid forward movement of connecting member 92 of the biasing element 88, irrespective of whether a full complement of the film assemblies or but a single film assembly is present in the magazine.

Assuming the magazine to be in part loaded and unmounted in the camera as shown in FIG. 10, the film assemblies are releasably held therein through contact of the inwardly overturned flanges 102 of the structure 78 with first marginal portions 48g of the mount of the foremost film assembly. However, as previously stated, when the magazine is mounted in the camera, second marginal mount portions 48h, located slightly inwardly or centrally of the portions 48g, are brought into slidable engagement with the spacing elements 33 which are of a carefully calculated length to determine the exact positioning of a foremost film assembly. Accordingly, each film assembly is successively positioned precisely at the focal plane and is in readiness to be slidably transported therefrom for processing through contact of the tongue 114 with its trailing edge 48f, after a photographic exposure. A second film assembly of the film pack, underlying the foremost film assembly, is held against inadvertent sideways movement, during removal of the latter due to frictional contact therewith, by contact of the leading edges 48e of the mount with the baffles 86. The indented area 104 permits the finder 20 to be mounted slightly nearer to the optical axis of the lens assembly. It is to be understood that an opaque light-shielding sheet (not shown), removable by means to be described for transporting the film assemblies, is positioned in front of the foremost film assembly prior to the first exposure. It is further to be understood that a removable protective covering such as an opaque foil may be employed to enclose the loaded magazine as initially provided, the covering being removed prior to or during mounting of the magazine on the camera. FIG. 11 illustrates a film assembly undergoing slidable removal from the magazine. It will be noted that the tab 96 has been partially depressed. This indicates a stage at which some of the film assemblies of the film pack have already been removed from the magazine.

Elements of the processing apparatus, additional to the pressure rolls 58 and 60, will now be treated in detail. A rectangular frame-like film-assembly transporting or propulsive element 106, comprises, essentially, two longitudinal L-shaped bars 106a and two transverse flat connecting bars 106b and 106c. The longitudinal bars are mounted for slidable linear movement at 90° to the axes of the pressure rolls in a pair of channels of tracks 108 of a modified U shape formed in the camera housing and extending parallel to the long or horizontal dimension thereof. The channels 108 terminate at one end in a pair of L-shaped apertures 110 and 112 through which the bar members 106a extend in closely fitting slidable engagement therewith, and at the other end in an opening at 107 leading to the pressure rolls 58 and 60. The propulsive element 106 is, appropriately, molded in one piece of a suitable substantially rigid, low friction plastic such as an acetal, or the like. It also includes a cross-piece or tongue 114 located, in terms of functional movement, at the leading end thereof and extending angularly rearwardly from the leading bar 106c. The slightly flattened extremity of the tongue is intended to bear or push against the trailing edge 48f of each film-assembly mount and actuate its movement from the focal plane to and between the pressure rolls. The aforesaid respective structure of the longitudinal bar members 106a and channels 108 leaves the rear surfaces of the bar members and the tongue 114 uncovered for functional purposes. The pair of stud elements 116 and 118, projecting toward one another from the connecting bars 106b and 106c, serves to actuate a locking mechanism for preventing an unwanted movement of the element 106, to be described below. The propulsion element 106 can be removed by separating the camera housing portion 14b from the main housing 14, as permitted by releasing the retaining screws 119.

A handle 120 is attached, via bar 106b, to bars 106a which extend outwardly through the apertures 110 and 112. Functional movement of the propulsive element 106 is obtained through manual operation of the handle. When it is pulled out to its fullest extent, as determined by engagement of the cross-bar 106c with the two fixed stops 152, the leading edge of the tongue or pusher 114 is in contact with the trailing edge of the foremost film assembly in the magazine which is positioned at the focal plane, as permitted by the widened aperture at 122 which allows entrance of the tongue 114 thereinto.

Assuming that the film assembly has undergone a photographic exposure and is to be processed, the handle 120 is thrust inwardly, in an even movement. The film assembly is moved toward the pressure rolls 58 and 60, its front marginal mount portions 48h being in slidable contact with the spacer elements 33 and its rear marginal mount portions 48i in slidable contact with the front marginal portions 48g and h of a succeeding film assembly, under the slight compressive force exerted by biasing element 88 of the magazine. The tapered tab 50 and liquid container 62, connected therewith through the medium of the intervening apron 66, to which it is bonded, are almost immediately forced between the pressure rolls, spreading them apart. Release and spreading of the processing liquid follows during continued pushing of the film assembly between the pressure rolls, as determined by the mutually cooperating structure of rolls and film assembly, previously described. Further in this regard, for facilitating an unrestrained and even application of compressive force by the rolls, it is contemplated, although not shown, that each roll shall be rotatably mounted in independent resilient suspension means, biased convergingly. In this manner the "bite" of the rolls tends to adjust to the plane of the advancing film assembly. As previously stated, when spreading of the processing liquid across the film component 34 has been completed, the rolls are additionally separated to trap any remaining excess of the processing liquid through ascension by elements of the roll 58 of the ramps 74 and 76.

A preferred structure of the processing apparatus is that which assumes that the pusher element 114 is held against further movement just short of the "bite" of the pressure rolls 58 and 60 by any suitable limit stop means as, for example, by contact of the handle 120 with the camera housing. In this instance, the trailing marginal portion of the film assembly mount 48, namely, the surfaces 48a and 48b, would still be held, under compression by the pressure rolls while the major forward portions of the film assembly would extend beyond the rolls and exteriorly of the camera through the shielded exit slot 124. Because the front of the film component 34, as described, is supplied uncovered to permit its photographic exposure, extraneous light which would be incident thereon, outside of the camera, after passage between the pressure rolls and prior to completion of the diffusion transfer process (for example, approximately 10 seconds) would, of course, ruin the print.

In view of the foregoing considerations, it must be assumed that the film assembly, after passing beyond the pressure rolls is protected against any possibility of becoming "light struck" until its processing is completed. One preferred means for the purpose constitutes a semichamber 125 (FIG. 18), pivotally mounted at 127, whereby it may be folded rearwardly against the housing and magazine when not in use. This type of chamber protects the uncovered front, only, of the film assembly during processing, the rear of the assembly being protected by the cover sheet 44. Alternatively, a separate chamber may be releasably attached to the camera, as by the flange means 126, so as to overlie the exit aperture 124 and receive each film assembly immediately following its compression. Imbibition of the processing liquid and completion of the diffusion transfer operation would occur within the chamber which, optionally, could be rigid, flexible or movable and completely or partially enclosing. One type of chamber would include access means whereby the film assembly would be deposited therein and could be removed, manually, upon completion of processing. Another type would assume the trailing portion of the film mount to be still held between the pressure rolls, as above described, and would require its being pulled manually completely through the exit slot 124. A further method of protecting the film assembly against damage from ambient light entering the uncovered front or base layer 35, following its removal from the camera and prior to completion of the processing step, contemplates the superimposition of a protective opaque sheet or coating on the open front surface. This would enable the immediate ejection of the film assembly from the pressure rolls without the necessity of employing a chamber for imbibition purposes.

The above-described alternatives relative to disposition of the film assembly following its compression bear, of course, upon the length of the stroke required of the propulsive element 106. If a complete passage of the film assembly into a processing chamber is required, the leading driving edge of the tongue 114 is to be assumed as capable of pushing the film assembly completely through the bite of the rolls, in which event it may, itself, enter or pass between the rolls and a longer stroke be required. If, however, it is unnecessary to push the film assembly completely beyond the rolls, the maximum position of the tongue 114 is predeterminedly established closely adjacent to the entering side of the rolls and a shorter stroke is possible. If the aforesaid protective sheet is employed at the open front of the film assembly, either a complete or partial ejection of the film assembly may be provided by the propulsive element 106.

After completing processing of each film assembly and assuming its location outside of the camera, it can be immediately brought to a finally mounted state for direct viewing or projection. This is accomplished by first manually separating the tab 50 from the mount 48, the brittle frangible connecting pieces 51 being easily broken for the purpose. Holding the tab and attached film-assembly portions between the thumb and forefinger, the bib 66, cover sheet 44, adhesion control sheet 42 and emulsion 40 are stripped, as a unit, from the image-receiving layer 38. The latter bears the black-and-white image correctly aligned with the color screen. After coating the then-externally-located image-receiving layer with a stabilizing and protective substance, as may be necessary, the mounted transparency is ready for direct viewing or projection.

In transporting each film assembly 32 from the focal plane behind exposure aperture 22, between the pressure rolls 58 and 60, and through the exit slot 124, it is essential that a complete cycle be performed before a similar treatment of the next film assembly in the magazine 12 is commenced. This is required for several reasons. In the first place, a continuous even movement of the film assembly between the pressure rolls is necessary to effect a correct spreading of the processing liquid and satisfactory image formation. Secondly, any return movement of the propulsive means 106 to a location such as to engage a succeeding film assembly, prior to completing the compression of its predecessor by pushing the handle 120 inwardly to its limit, might cause a jamming of the two film assemblies. This would necessitate removing the magazine and cause the destructive exposure of at least some, if not all, of the film assemblies. A safety locking means 128, illustrated in FIGS. 13–17, is therefore provided to insure a given unidirectional operation, that is, to prevent a complete return movement of the propulsive element 106 until the compression of a given film assembly has been completed.

Assuming the camera to be positioned as shown, the propulsive-element locking means 128 is essentially composed of a vertically disposed assemblage of cams, levers and limit stops, fixedly attached to a shaft 130, the latter being rotatably mounted in a pair of brackets 132. The aforesaid cams and levers are rotated together in response to contact of certain members thereof by the studs or actuators 116 and 118 incorporated with the propulsive element 106, the integral studs being moved linearly with the latter, as indicated. Elements of the assemblage 128 which are mounted on the shaft 130 include, in order from top to bottom, a cam 134, an arm 136, a cam 138, an arm 140 and a lever 142. The arms 136 and 140 are identical and extend similarly from identical peripheral locations on the shaft 130. The lever 142 is biased by an extension spring 144 operating in an over-center manner and connected, respectively, between the tip of the lever and a fixed pin 145. Maximum counterclockwise rotation of the assemblage is determined by contact of the arms 136 and 140 with the limit stops 146 and 148. Maximum clockwise rotation of the assemblage is fixed by contact of the cam 138 with the limit stop 150.

Figure 12:
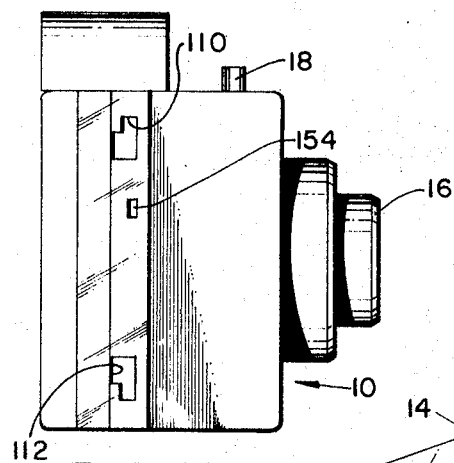
FIG. 12 is a diagrammatic side elevation view of the camera illustrating apparatus features of the invention.
Figure 13:
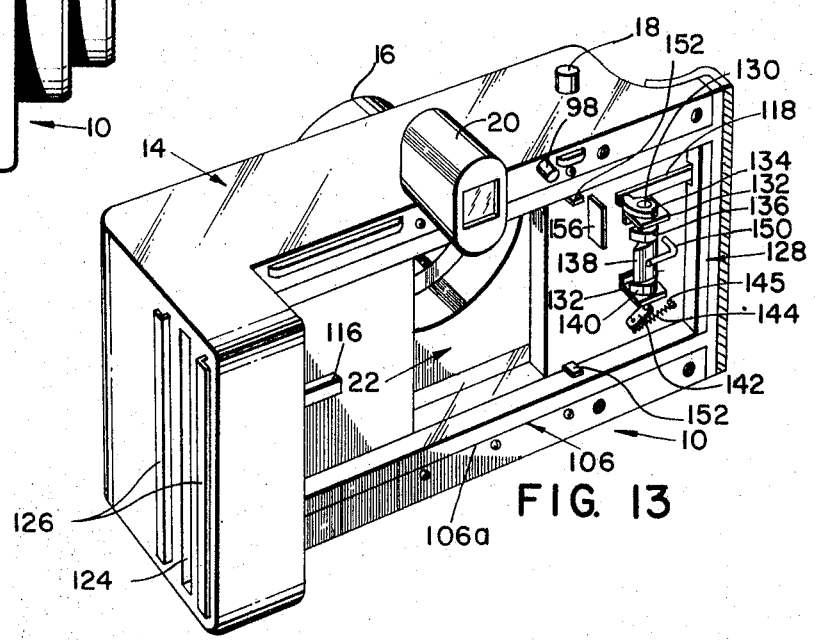
Figure 14:
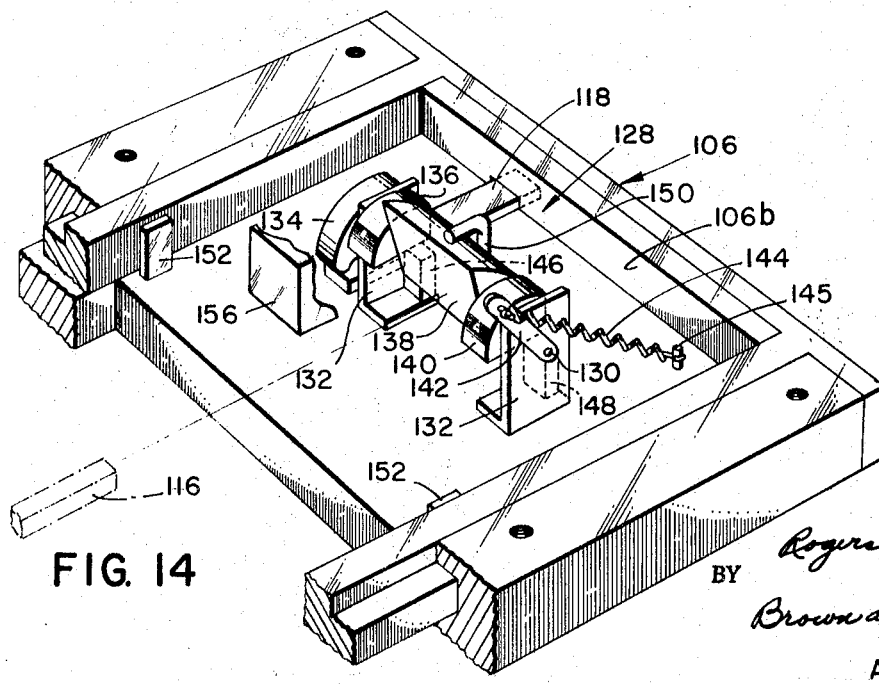

In FIG. 13, the propulsive apparatus 106 is shown at its maximum inward position with handle 120 contacting the camera housing. This situation would exist either prior to the first exposure as, for example, during transport of the camera, or after completing the exposure and processing of a given film assembly. The condition of the locking means 128 accompanying this position is illustrated. The actuating stud 118 has entered the aperture 154 formed in the housing (FIG. 12) and has pushed the cam 134 in a counterclockwise direction. All elements fixed to shaft 130 have been similarly rotated, the degree of rotation having been determined by contact of cam 138 with the limit stop 150. When the stud 118 is withdrawn, the elements will still be held at the positions shown through the biasing action of the spring 144. FIG. 14 illustrates a similar condition to that of FIG. 13 and merely shows more clearly the configuration and positions of the various elements.

Let it now be assumed, as shown in FIG. 15, that a photographic exposure of a film assembly has taken place and that the handle has, immediately thereafter, been pulled outwardly to its maximum outward position, as determined by contact of the cross-member 106c with the limit stops 152. It will be understood that the tongue 114 of the propulsive apparatus 106 has now assumed a position at 122 (FIG. 1) which would place it in contact with the right-hand or trailing edge of any film assembly then located for exposure at the focal plane. Because the actuating stud 118 has been withdrawn from the housing aperture 154, the possibility of ambient light entering this aperture and affecting photosensitive materials is safeguarded against by the baffle 156, located to obstruct light entering the aperture. While the baffle is shown merely as a single plate so as not to obscure the locking device, it is to be understood that it preferably includes side members, as indicated in FIG. 14, which extend to the aperture 154 so as to completely surround or box any light rays entering the latter. The actuating stud 116 has contacted the forward surface of cam 138 and has rotated the cam and all other elements fixed to the shaft 130 in a clockwise direction. The degree of rotation has been determined by the contacting relation of the stud 116 and cam 138, the stud acting as a limit stop at this stage. The lever 142 and spring 144 have passed over center and will now hold the elements at positions of extreme clockwise rotation when the actuating stud 116 is withdrawn, as shown in FIG. 16.

Movement of the handle and propulsive apparatus 106 in an inward or film-assembly processing direction, exemplified by the arrow 157, is illustrated in FIG. 16, it being understood that a film assembly (not shown) is undergoing transport toward the pressure rolls 58 and 60 through contact therewith by the tongue 114. The actuating stud 116 has been withdrawn from that condition of contact with the cam 138 which was shown in FIG. 15. All elements of the locking means 128 have undergone a slight additional rotation in a clockwise direction, as impelled by the spring 144. The limit of this rotation is determined by contact of the arms 136 and 140 with the limit stops 146 and 148.

Assuming a continued inward movement of the propulsive apparatus 106 until the handle 120 comes in contact with the housing, the condition illustrated in FIG. 13 and previously described would again be achieved and the apparatus would have performed a complete processing cycle. However, let it be assumed, as illustrated in FIG. 17, that the operator, inadvertently, fails to complete the cycle, pauses in the inward movement, and again draws the handle outwardly. The propulsive apparatus 106 would now be prevented from reaching its maximum outward position by contact of the actuating stud 116 with the cam 138, the latter serving as a barrier to prevent the stud 116 from moving beyond it. Accordingly, the transport apparatus 106 must again be moved inwardly to its maximum permitted distance before the tongue 114 can be returned to a position for engaging the next succeeding film assembly, that is, before the cam 138 can be rotated in a counterclockwise direction to a position which would permit unimpeded passage of the actuating stud to the position illustrated in FIGURE 1.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a miniature camera including a housing, a lens, shutter and diaphragm assembly, an exposure aperture and means for effecting a photographic exposure, apparatus for so treating a plurality of semi-mounted photographic film assemblies embodying a releasably-confined processing liquid, carried in a magazine and adapted to a diffusion-transfer process of image formation, as to produce finished transparencies for direct viewing and projection, said apparatus comprising mounting and positioning means incorporated with said camera housing and magazine for mounting said magazine on said housing so that a substantially open face of said magazine is aligned with said exposure aperture, a generally rectangular frame-like film-assembly transporting element including, respectively, a pair of longitudinal bar members, a pair of transverse bar members interconnecting the extremities of said longitudinal bar members, a member for contacting a film assembly extending at an acute angle rearwardly from the leading one of said transverse bar members in terms of the direction of its film-assembly transporting function, and a pair of stud members projecting substantially at 90° inwardly toward one another from said transverse bar members, a pair of rotatable resiliently-mounted pressure rolls having their axes disposed at 90° to said longitudinal bar members and positioned adjacent to an exit-aperture end of said housing, a pair of channel means formed in said housing and extending substantially from one end thereof past said exposure aperture to a location proximate to said pressure rolls, said channel means slidably mounting said longitudinal bar members of the transporting element to enable slidable longitudinal movement of the latter, limit stop means defining the extremities of slidable movement of said transporting element, means for actuating said transporting element, and means providing an elongated light-shielded aperture at said exit-aperture end of said housing for passage of said film assemblies therethrough after their photographic exposure and movement between said pressure rolls.

2. Apparatus for incorporation with a camera as defined in claim 1, wherein said contacting member is an elongated tongue-like element for bearing against the transverse trailing edge of a film-assembly mount, whereby said transporting element is adapted, after a photographic exposure, to push said film assembly from the focal plane at said exposure aperture between said pressure rolls to effect processing thereof.

3. Apparatus for incorporation with a camera, as defined in claim 1, wherein said mounting and positioning means for said magazine includes cooperating, releasably engaging means of said magazine and camera.

4. Apparatus for incorporation with a camera, as defined in claim 1, wherein the forward one of said pressure rolls includes a peripheral groove of a given depth and width at each extremity adapted to accommodate a longitudinally-extending portion of said film assembly of a given thickness at a front side thereof, and wherein said rear pressure roll also includes a peripheral groove at each extremity but of a depth and width different from the groove of said forward pressure roll, said groove of the rear pressure roll being adapted to accommodate a longitudinally-extending channeled portion of said film assembly at a rear side thereof.

5. Apparatus for incorporation with a camera, as defined in claim 4, wherein said rear pressure roll includes a peripheral flange adjacent to said peripheral groove at each extremity, said peripheral flanges of said rear roll and said peripheral grooves of said forward roll being aligned for assuming the compressive load of said pressure rolls.

6. Apparatus for incorporation with a camera, as defined in claim 1, wherein said longitudinal bar members are of an L-shaped cross-section and wherein said channels are of a modified U-shape thereby permitting said contacting member to be uncovered by said channels for bearing against each of said film assemblies.

7. Appparatus for incorporation with a camera, as defined in claim 1, wherein a plurality of protuberances of a given height are provided so as to extend rearwardly from said camera housing in the area facing said magazine, when mounted, and bear against marginal portions of a foremost film assembly in said magazine, said protuberances constituting spacer elements for establishing said film assembly precisely at the focal plane of the camera and permitting slidable movement of said film assembly thereacross after its exposure at said focal plane.

8. In a miniature camera including a housing, a lens, shutter and diaphragm assembly, an exposure aperture and means for effecting a photographic exposure, apparatus for so treating a plurality of semi-mounted photographic film assemblies embodying a releasably-confined processing liquid, carried in a magazine and adapted to a diffusion-transfer process of image formation, as to produce finished transparencies for direct viewing and projection, said apparatus comprising mounting and positioning means incorporated with said camera housing and magazine for mounting said magazine on said housing so that a substantially open face of said magazine is aligned with said exposure aperture, a rectangular frame-like film-assembly transporting element including respectively, a pair of longitudinal bar members, each projecting at one end through and in slidable engagement with an individual closely-fitting aperture formed in an end of said camera housing, a pair of transverse bar members interconnecting the extremities of said longitudinal bar members, a contacting member extending at an acute angle rearwardly from the leading one of said transverse bar members in terms of the direction of its film-assembly transporting function, a pair of stud members projecting substantially at 90° inwardly toward one another from said transverse members, and a handle for manually actuating said film-assembly transporting element attached to that transverse bar member interconnecting said longitudinal bar members exteriorly of said housing, a pair of rotatable separable pressure rolls having their axes disposed at 90° to said longitudinal bar members and positioned adjacent to an exit-aperture end of said housing, a pair of channel means formed in said housing and extending substantially from one end thereof past said exposure aperture to a location proximate to said pressure rolls, said channel means slidably mounting said longitudinal bar members of the transporting element to enable slidable longitudinal movement of the latter, limit stop means defining the extremes of slidable movement of said transporting element, and means providing an elongated light-shielded aperture at said exit-aperture end of said housing for passage of said film assemblies therethrough after their photographic exposure and movement between said pressure rolls.

9. In a miniature camera including a housing, a lens, shutter and diaphragm assembly, an exposure aperture and means for effecting a photographic exposure, apparatus for so treating a plurality of semi-mounted photographic film assemblies embodying a releasably-confined processing liquid, carried in a magazine and adapted to a diffusion-transfer process of image formation, as to produce finished transparencies for direct viewing and projection, said apparatus comprising mounting and positioning means incorporated with said camera housing and magazine for mounting said magazine on said housing so that a substantially open face of said magazine is aligned with said exposure aperture, a rectangular frame-like film-assembly transporting element including, respectively, a pair of longitudinal bar members, each projecting at one end through and in slidable engagement with a separate closely-fitting aperture formed in an end of said camera housnig, a pair of transverse bar members interconnecting the extremities of said longitudinal bar members, a contacting member extending at an acute angle rearwardly from the leading one of said transverse bar members in terms of the direction of its film-assembly transporting function, a pair of stud members projecting substantially at 90° inwardly toward one another from said transverse bar members, and a handle for manually actuating said film-assembly transporting element attached to that transverse bar member interconnecting said longitudinal bar members exteriorly of said housing, a pair of rotatable separable pressure rolls having their axes disposed at 90° to said longitudinal bar members and positioned adjacent to an exit-aperture end of said housing, a pair of channel means formed in said housing and extending substantially from one end thereof past said exposure aperture to a location proximate to said pressure rolls, said channel means slidably mounting said longitudinal bar members of the transporting element to enable longitudinal movement of the latter, limit stop means defining the extremes of slidable movement of said transporting element, means providing an elongated light-shielded aperture formed at said exit-aperture end of said housing for passage of said film assemblies therethrough after their photographic exposure and movement between said pressure rolls, and locking means for engaging said transporting element at a given stage of movement thereof to prevent its complete return to a location for engaging a second film assembly before it has completed its transporting function relative to a preceding film assembly, said locking means being mounted within said housing adjacent to said closely-fitting apertures and operative in response to contact by said stud members.

10. Apparatus for incorporation with a camera, as defined in claim 9, wherein said locking means comprises an assemblage of rotatable cams and levers, limit stop means, and an over-center biasing spring interconnecting one of said levels and fixed means, whereby one of said stud members actuates a lever of said assemblage to permit a maximum outward movement of said handle and whereby the other of said stud members contacts a cam of said assemblage to limit said outward movement of said handle to that which is less than said maximum movement.

11. Apparatus for incorporation with a camera, as defined in claim 10, wherein said first-named stud member is adapted to move back-and-forth linearly through a light-shielded aperture formed in that end of said housing in which are located said closely-fitting apertures for said longitudinal bar members.

12. Apparatus for incorporation with a camera, as defined in claim 10, wherein said stud members project from said bar members at relatively different transverse locations and wherein said lever which is actuated and said cam which is contacted are fixedly attached to a rotatable shaft at different locations longitudinally of its axis.

13. In a miniature camera including a housing, a lens, shutter and diaphragm assembly, an exposure aperture and means for effecting a photographic exposure, apparatus for so treating a plurality of partially-mounted photographic film assemblies embodying a releasably-confined processing liquid, carried in a magazine and adapted to a diffusion-transfer process of image formation, as to produce finished transparencies for direct viewing and projection, said apparatus comprising mounting and positioning means incorporated with said camera housing and magazine for mounting said magazine on said housing so that a substantially open face of said magazine is aligned with said exposure aperture, a generally rectangular frame-like film-assembly transporting element including, respectively, a pair of longitudinal bar members, a pair of transverse bar members interconnecting the extremities of said longitudinal bar members, and a member for contacting a film assembly extending outwardly from one of said transverse bar members, a pair of rotatable resiliently-mounted pressure rolls having their axes disposed at 90° to said longitudinal bar members and positioned adjacent to an exit-aperture end of said housing, a pair of channel means formed in said housing and extending substantially from one end thereof past said exposure aperture to a location proximate to said pressure rolls, said channel means slidably mounting said longitudinal bar members of the transporting element to enable slidable longitudinal movement of the latter, limit stop means defining the extremes of slidable movement of said transporting element, means for actuating said transporting element, and means providing an elongated light-shielded aperture at said exit-aperture end of said housing for passage of said film assemblies therethrough after their photographic exposure and movement between said pressure rolls.

14. In a miniature camera including a housing, a lens, shutter and diaphragm assembly, an exposure aperture and means for effecting a photographic exposure, apparatus for so treating a plurality of partially-mounted photographic film assemblies embodying a releasably-confined processing liquid, carried in a magazine and adapted to a diffusion-transfer process of image formation, as to produce finished transparencies for direct viewing and projection, said apparatus comprising mounting and positioning means incorporated with said camera housing and magazine for mounting said magazine on said housing so that a substantially open face of said magazine is aligned with said exposure aperture, a generally rectangular frame-like film-assembly transporting element including, respectively, a pair of longitudinal bar members, a pair of transverse bar members interconnecting the extremities of said longitudinal bar members, and a member for contacting a film assembly extending outwardly from one of said transverse bar members, a pair of rotatable resiliently-mounted pressure rolls having their axes disposed at 90° to said longitudinal bar members and positioned adjacent to an exit-aperture end of said housing, a pair of channel means formed in said housing and extending substantially from one end thereof past said exposure aperture to a location proximate to said pressure rolls, said channel means slidably mounting said longitudinal bar members of the transporting element to enable slidable longitudinal movement of the latter, limit stop means defining the extremes of slidable movement of said transporting element, means for actuating said transporting element, means providing an elongated light-shielded aperture at said exit-aperture end of said housing for passage of said film assemblies therethrough after their photographic exposure and movement between said pressure rolls, and locking means for engaging said transporting element at a given stage of movement thereof to prevent its complete return to a location for engaging a succeeding film assembly before it has completed its transporting function relative to a preceding film assembly.

15. In a miniature camera including a housing, a lens, shutter and diaphragm assembly, an exposure aperture and means for effecting a photographic exposure, apparatus for so treating a plurality of partially-mounted photographic film assemblies embodying a releasably-confined processing liquid, carried in a magazine and adapted to a diffusion-transfer process of image formation, as to produce finished transparencies for direct viewing and projection, said apparatus comprising mounting and positioning means incorporated with said camera housing and magazine for mounting said magazine on said housing so that a substantially open face of said magazine is aligned with said exposure aperture, a generally rectangular frame-like film-assembly transporting element including respectively, a pair of longitudinal bar members, a pair of transverse bar members interconnecting the extremities of said longitudinal bar members, and a member for contacting a film assembly extending outwardly from one of said transverse bar members, a pair of rotatable resiliently-mounted pressure rolls having their axes disposed at 90° to said longitudinal bar members and positioned adjacent to an exit-aperture end of said housing, a pair of channel means formed in said housing and extending substantially from one end thereof past said exposure aperture to a location proximate to said pressure rolls, said channel means slidably mounting said longitudinal bar members of the transporting element to enable slidable longitudinal movement of the latter, limit stop means defining the extremes of slidable movement of said transporting element, means for actuating said transporting element, means providing an elongated light-shielded aperture at said exit-aperture end of said housing for passage of said film assemblies therethrough after their photographic exposure and movement between said pressure rolls, and semi-enclosed chamber means mounted adjacent to said light-shielded aperture for receiving each of said film assemblies upon its emergence from said camera and releasably holding the film assembly so that its emulsion is protected against subjection to actinic light until its processing has been completed.

16. Apparatus, as defined in claim 15, wherein said semi-enclosed chamber is pivotally mounted on said camera housing and is adapted to be folded rearwardly against said housing when not in use.

17. A semi-enclosed chamber adapted to be pivotally mounted on a camera of a type accommodating a plurality of film assemblies each of which includes a processing liquid and is capable of producing a finished print by a diffusion transfer process initiated by compressive means of said camera, and chamber serving to hold each film assembly briefly for completion of said process and being located adjacent to an exit aperture of said camera said chamber comprising a major plane surface in the form of a supporting platform, a yielding material bonded to said platform providing a lighttight contact with said film assembly, a pair of overturned flanges extending along the longitudinal edges of said platform for holding said film assembly firmly thereagainst, means for pivotally mounting said chamber on said camera, and a cut-out area formed in said platform for manually grasping the leading portions of each said film assembly.

18. In a camera including a housing, a lens, shutter and diaphragm assembly, an exposure aperture and means for effecting a photographic exposure, apparatus for so treating a plurality of substantially rigid photographic film assemblies carried in a magazine and adapted to a diffusion-transfer process of image formation, as to produce, after their exposure in said camera, finished photographic prints, said apparatus comprising mounting and positioning means incorporated with said camera housing and magazine for mounting said magazine on said housing so that a substantially open face of said magazine is aligned with said exposure aperture, a generally rectangular frame-like film-assembly transporting element including, respectively, a pair of longitudinal bar members, a pair of transverse bar members interconnecting the extremities of said longitudinal bar members, a member for contacting a film assembly extending from the leading one of said transverse bar members in terms of the direction of its film-assembly transporting function, and means interlocking with said transporting element for insuring completion of one processing cycle thereof prior to initiation of a second processing cycle, a pair of rotatable resiliently-mounted pressure rolls having their axes disposed substantially at 90° to said longitudinal bar members and positioned adjacent to an exit-aperture end of said housing, a pair of channel means formed in said housing and extending substantially from one end thereof past said exposure aperture to a location proximate to said pressure rolls, said channel means slidably mounting said longitudinal bar members of the transporting element to enable slidable longitudinal movement of the latter, limit stop means defining the extremes of slidable movement of said transporting element, means for actuating said transporting element, and means providing an elongated light-shield aperture at said exit-aperture end of said housing for passage of said film assemblies therethrough after their photographic exposure and movement between said pressure rolls.

References Cited

UNITED STATES PATENTS

| 1,992,223 | 2/1935 | Lauritz | 95—23 |
| 2,873,658 | 2/1959 | Land | 95—26 |

NORTON ANSHER, *Primary Examiner.*

G. M. HOFFMAN, *Assistant Examiner.*